United States Patent
Demange et al.

(10) Patent No.: US 7,552,898 B2
(45) Date of Patent: Jun. 30, 2009

(54) SENSOR SUPPORT FOR MOTOR VEHICLE

(75) Inventors: Jean-Yves Demange, Brignais (FR);
Pierre Montanvert, Villeurbanne (FR);
Fabrice Ollier, Miribel (FR)

(73) Assignee: Compagnie Plastic Omnium, Lyons (FR)

( * ) Notice: Subject to any disclaimer, the term of this patent is extended or adjusted under 35 U.S.C. 154(b) by 650 days.

(21) Appl. No.: 10/793,652

(22) Filed: Mar. 4, 2004

(65) Prior Publication Data

US 2004/0262458 A1    Dec. 30, 2004

(30) Foreign Application Priority Data

Mar. 4, 2003    (FR)    .................................... 03 02632

(51) Int. Cl.
*B21D 53/88*    (2006.01)
(52) U.S. Cl. ...................................... 248/27.3; 293/115
(58) Field of Classification Search ................ 248/27.1, 248/27.3; 293/115
See application file for complete search history.

(56) References Cited

U.S. PATENT DOCUMENTS

| | | | | |
|---|---|---|---|---|
| 2,130,548 A | * | 9/1938 | Jones | .......................... 411/548 |
| 5,326,133 A | * | 7/1994 | Breed et al. | .................. 280/735 |
| 6,315,338 B1 | | 11/2001 | Schneider | |
| 6,447,032 B1 | * | 9/2002 | Howell, Sr. | .................. 293/115 |
| 6,729,429 B2 | * | 5/2004 | Takahashi | .................... 180/271 |
| 6,761,385 B2 | * | 7/2004 | Taljaard | ...................... 293/115 |
| 6,932,413 B2 | * | 8/2005 | Lloyd | .......................... 296/115 |
| 2003/0000753 A1 | | 1/2003 | Shih | |

FOREIGN PATENT DOCUMENTS

| | | |
|---|---|---|
| DE | 195 30 262 | 2/1996 |
| DE | 101 28 967 | 12/2002 |
| FR | 2 809 691 | 12/2001 |

* cited by examiner

*Primary Examiner*—Amy J. Sterling
*Assistant Examiner*—Steven Marsh
(74) *Attorney, Agent, or Firm*—James R. Williams

(57) ABSTRACT

A sensor support for a motor vehicle, the support comprising an assembly base carrier for receiving a sensor, wherein the assembly base is shaped so as to be secured to two portions of a bar in a grille, said portions being situated in alignment with each other but being spaced apart so as to leave room for a sensor.

9 Claims, 9 Drawing Sheets

SENSOR SUPPORT FOR MOTOR VEHICLE

FIELD OF THE INVENTION

The invention relates to manufacturing outside parts for motor vehicles and to fixing sensors of various kinds on said outside parts.

In particular, the invention relates to fixing detection sensors at the front or the rear of a motor vehicle.

BACKGROUND OF THE INVENTION

Document EP1 005692 discloses an arrangement for fixing a sensor to a bumper skin.

In such a device, a sensor support co-operates with special shapes provided on the bumper skin, and further comprises a clearance opening leaving a field of view to the sensor.

A drawback of that known device is that the bumper skin must be made specifically in order to receive the sensor. In other words, it is necessary to make both bumper skins which are for receiving sensors and bumper skins which are not for receiving sensors, thereby complicating management and storage of bumper skins.

In addition, for a vehicle that is already in existence, adding a sensor requires the bumper skin to be replaced.

SUMMARY OF THE INVENTION

The invention seeks to solve the problem set out above, by providing a sensor support for a motor vehicle that is suitable for being fixed on any bumper skin. To this end, the invention provides a sensor support for a motor vehicle, the support comprising an assembly base carrier for receiving a sensor, wherein the assembly base is shaped so as to be secured to two portions of a bar in a grille, said portions being situated in alignment with each other but being spaced apart so as to leave room for a sensor.

Not only is there no need for the grille receiving the support to be configured specially during manufacture, but in addition, on a vehicle that is already in existence, there is no difficulty in adding a sensor. Indeed it suffices to cut away a central portion from one of the bars of a grille already present on the vehicle and to fix the support of the invention on the two aligned portions of the bar situated on either side of the central portion that has been cut away.

In addition, a grille provided with a sensor support can be modified in appearance by adding trim to emphasize the presence of the sensor.

By way of example, fixing the sensor support to the grille consists in sandwiching the two aligned portions of the bar between a strength member and a piece of trim constituting the assembly base for the support.

By means of this method of fixing, the bar that has been cut is restored to good rigidity during final assembly.

A sensor support for a motor vehicle of the invention may further comprise one or more of the following characteristics:
- an assembly base comprises a strength member and a piece of trim covering said strength member;
- a strength member and a piece of trim are arranged to sandwich between them the two aligned portions of the bar;
- a piece of trim includes a holder for holding the two aligned portions of bar between the piece of trim and the strength member;
- a holder comprises a fixed first portion of the piece of trim and a flap second portion also belonging to the piece of trim, the first and second portions being suitable for uniting so as to become mutually engaged by snap-fastening, thereby extending around the two bar portions and the strength member;
- a holder comprises two first portions belonging to the piece of trim and two second portions belonging to the strength member, the first and second portions being suitable for uniting to be held together by snap-fastening, enclosing between the two bar portions between the piece of trim and the strength member; and
- a holder comprises projecting elements belonging to the piece of trim and orifices belonging to the strength member, the piece of trim and the strength member being arranged to sandwich between them the portions of bar while the projecting elements pass through and project beyond the orifices in which they can subsequently be held by riveting or flattening.

DETAILED DESCRIPTION OF THE DRAWING

Figure 1:
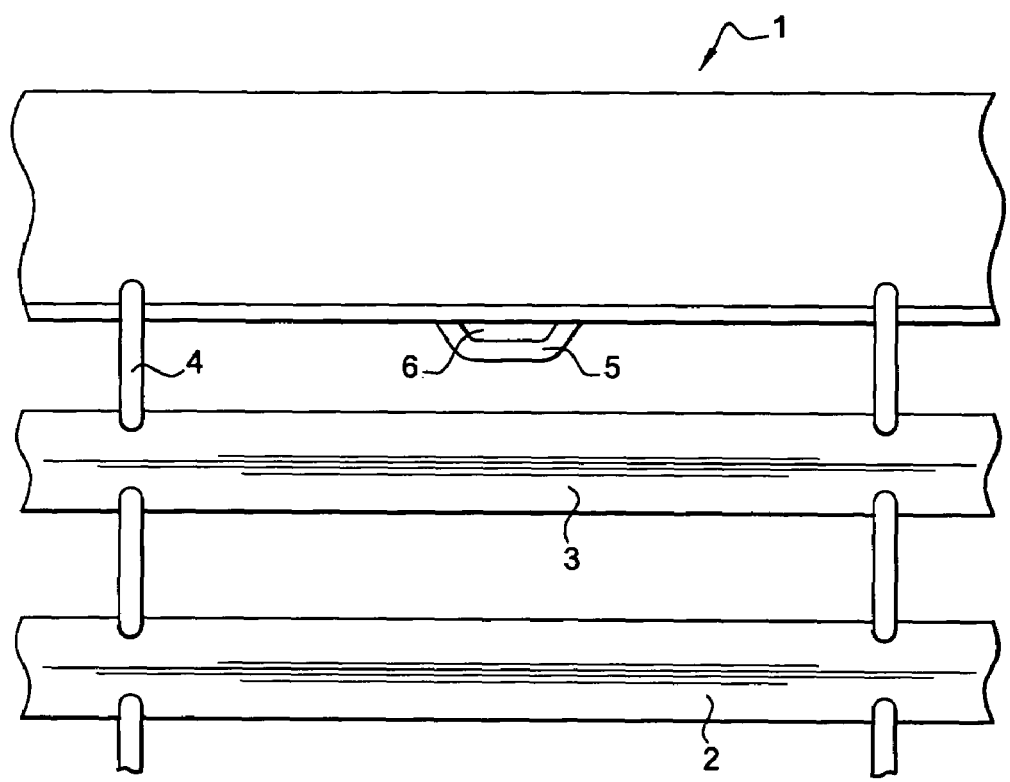
FIG. 1 is a front view of an air inlet grille.

A grille fixed in an air inlet opening of a bumper skin 1 includes two bars 2 and 3 in particular, which bars are interconnected and connected to the skin by uprights 4 extending across them, which uprights are vertical when the grille is in position on a vehicle with its bars 2, 3 extending horizontally.

The top edge of the opening includes an arrangement 5 in its central portion defining a horizontal slot 6.

Figure 2:
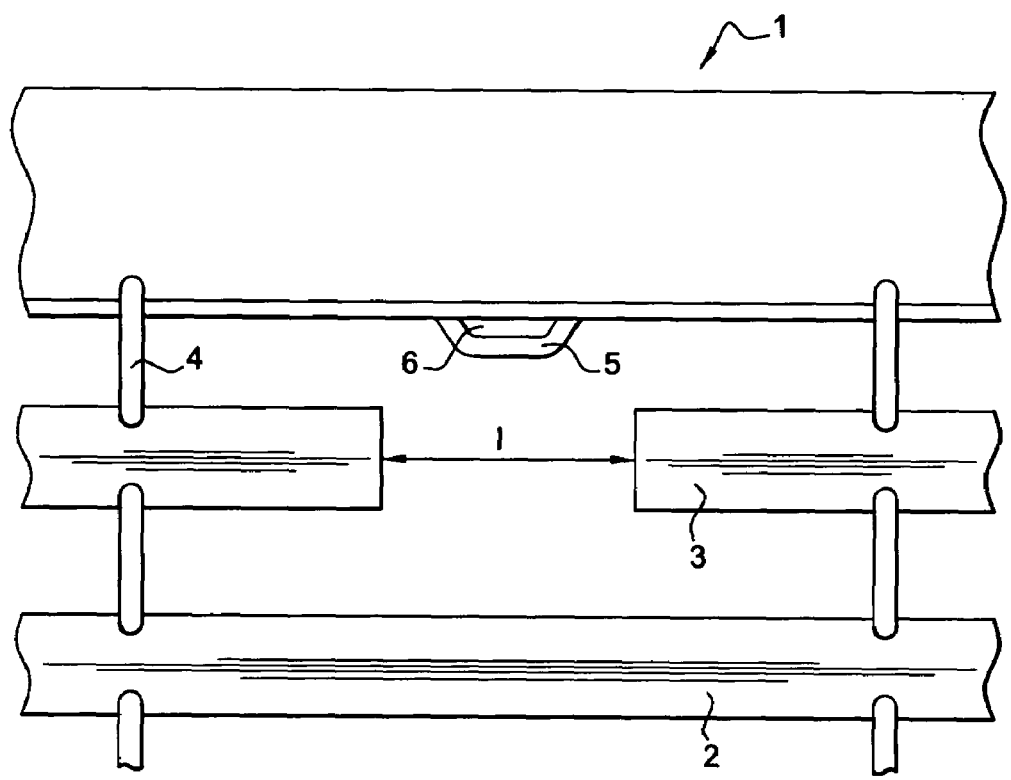
FIG. 2 is a view analogous to FIG. 1 after cutting out a portion of a bar.

In order to fix a sensor, a portion of the top bar 3 is cut away as shown in FIG. 2 so as to open up a space of length "("  leaving room for a sensor housed in a supporting bushing.

The bar 3 is weakened by having a portion cut away, but it is subsequently reinforced by the sensor support, as described below.

Figure 3:
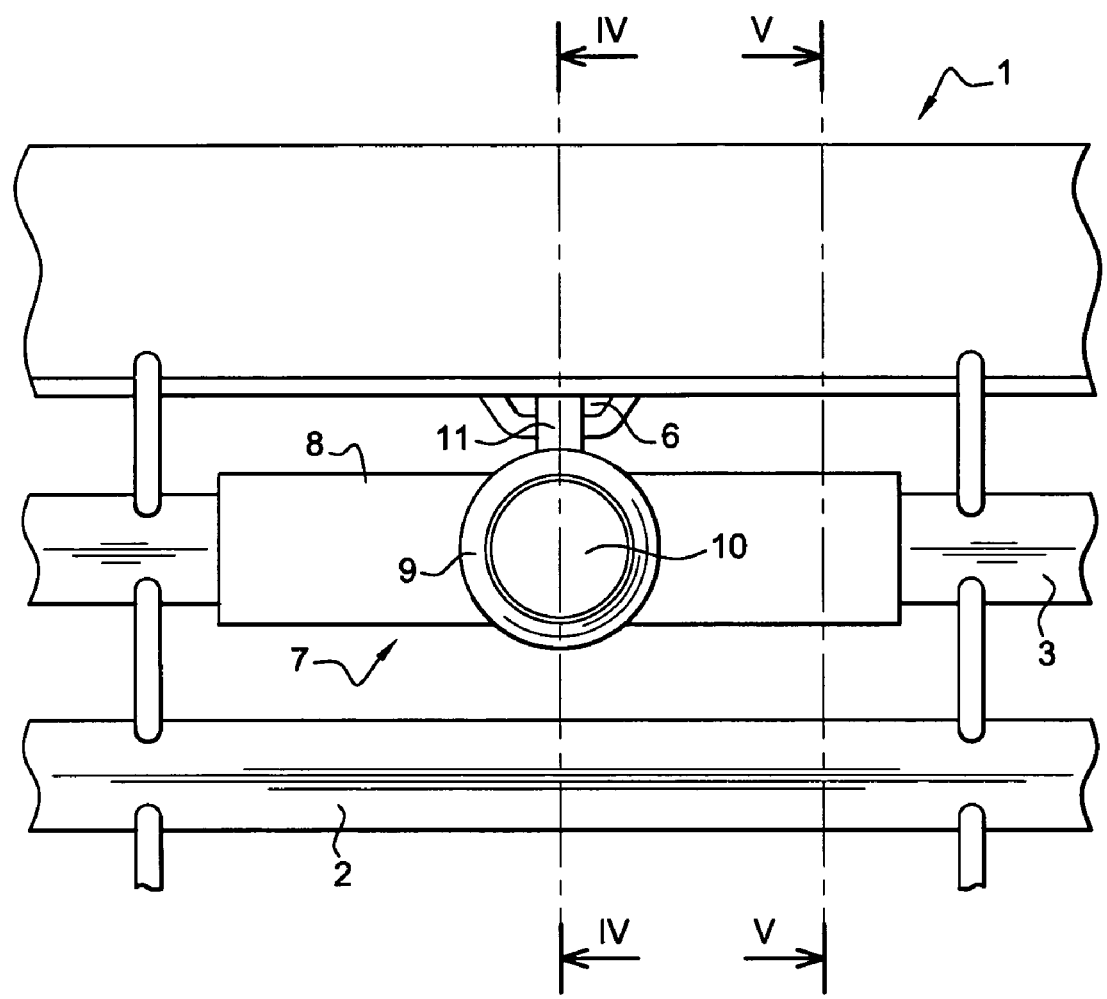
FIG. 3 is a view analogous to FIG. 2 after putting a sensor support into position.

In FIG. 3, there can be seen the sensor support 7 in position on the bar 3 that has had a portion cut away.

The sensor support 7 comprises an assembly base 8 and a support bushing 9 receiving the sensor 10. The support bushing 9 is substantially cylindrical in shape and is not described in detail herein.

The assembly base 8 is constituted by two wings disposed in alignment with each other and shaped so as to be suitable for pressing against respective ones of the two aligned portions of the bar 3, fitting snugly over the outside shape thereof.

Figure 4:
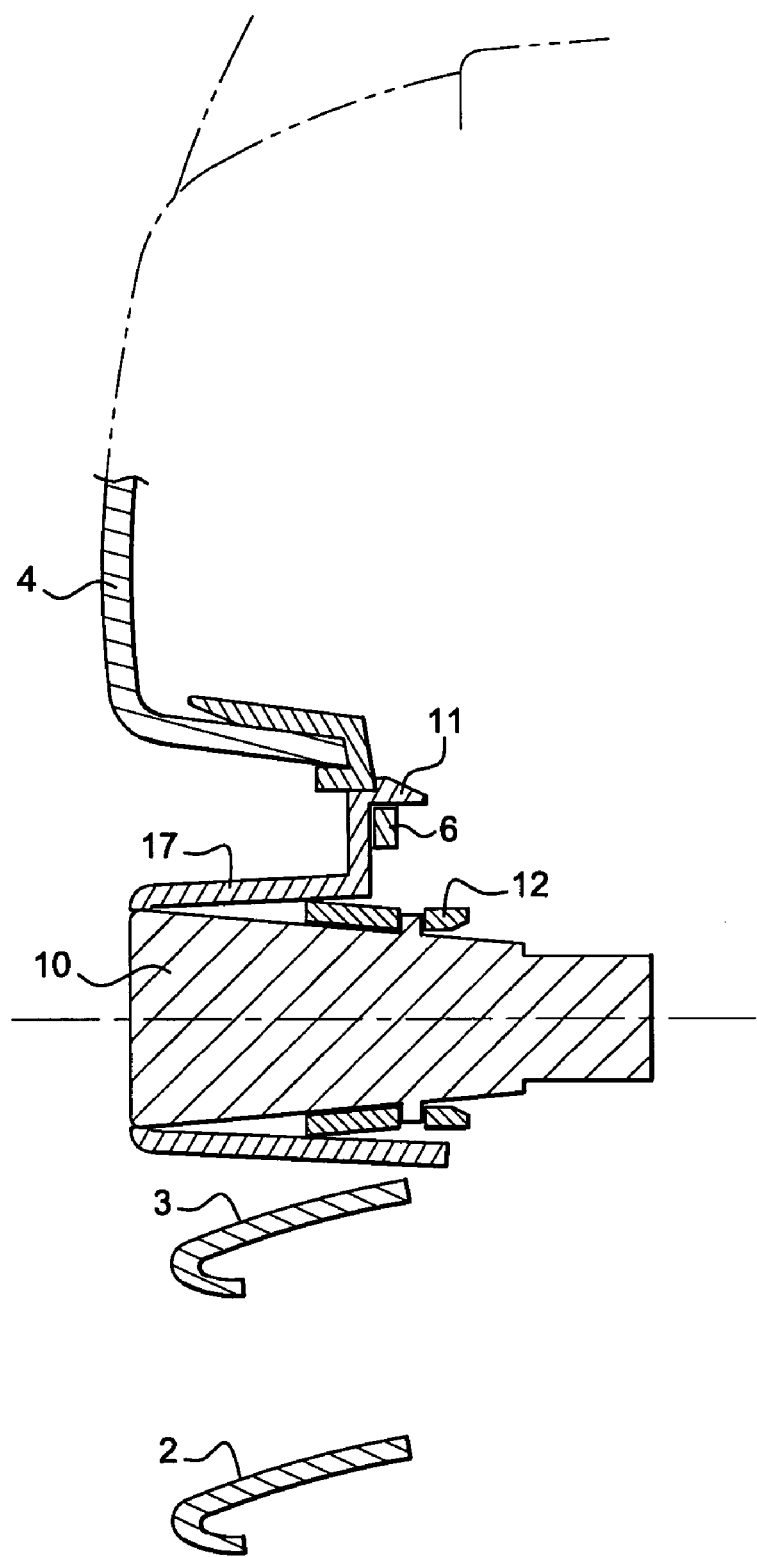
FIG. 4 is a section view on IV-IV of FIG. 3.

The support bushing 9 also has a lug 11 which is snap-fastened in the slot 6, as can be seen more clearly in FIG. 4.

The sensor support is generally constituted by two parts, firstly a plastics material part defining both the visible portion 17 of the support bushing 9 and the visible portion 18 of the assembly base 8, and secondly a non-metallic strength member (but which could equally well be metallic in some other embodiment) that also has a portion 12 forming the support bushing and two wing-forming portions 13.

Below, reference is made to the trim portion 18 and to the strength member portion 13 which are referred to respectively as the piece of trim 18 and the strength member 13.

Figure 5:
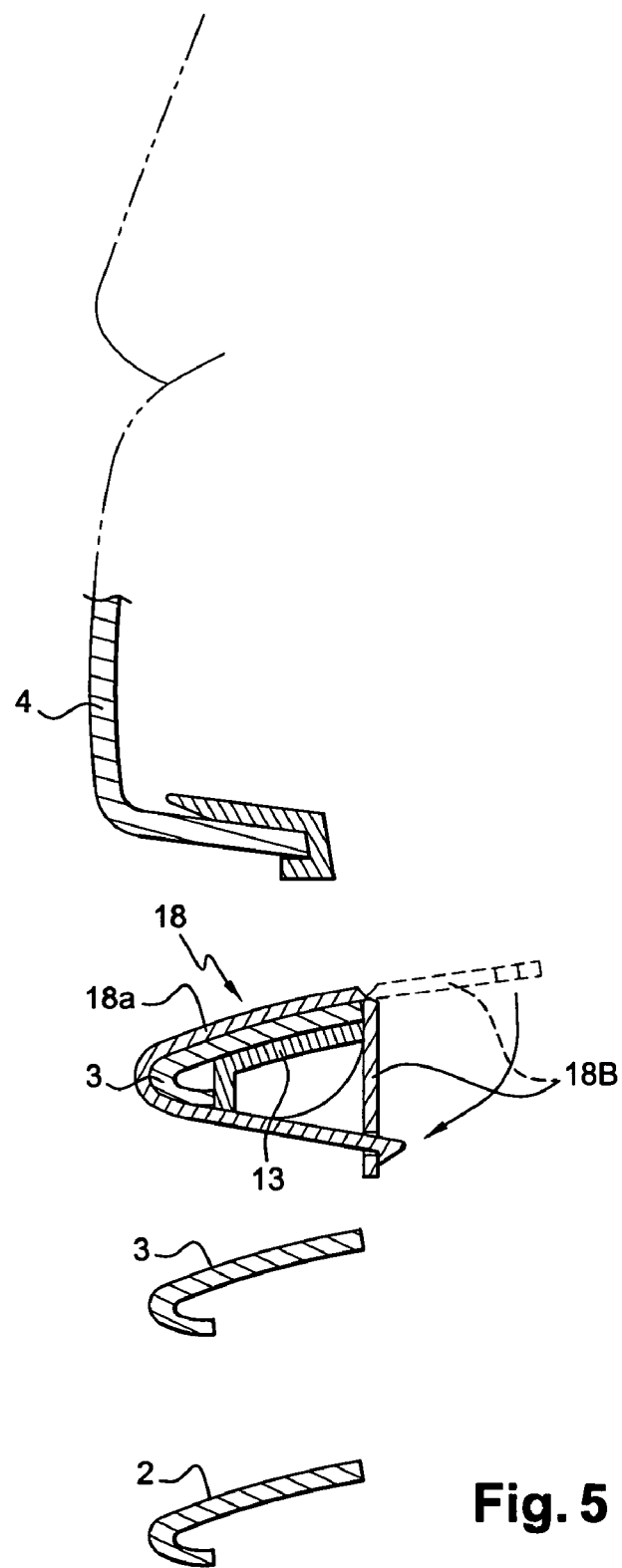
FIG. 5 is a section view on V-V of FIG. 3.

As can be seen in FIG. 5, the piece of trim 18 covers the portion of bar 3, fitting snugly to its outside shape. In addition, it comprises a fixed first portion 18*a* and a flap second portion 18*b* whose ends serve to sandwich the bar 3 between the strength member 13 and the piece of trim 18, with the trim thus extending right around it.

Figure 6:
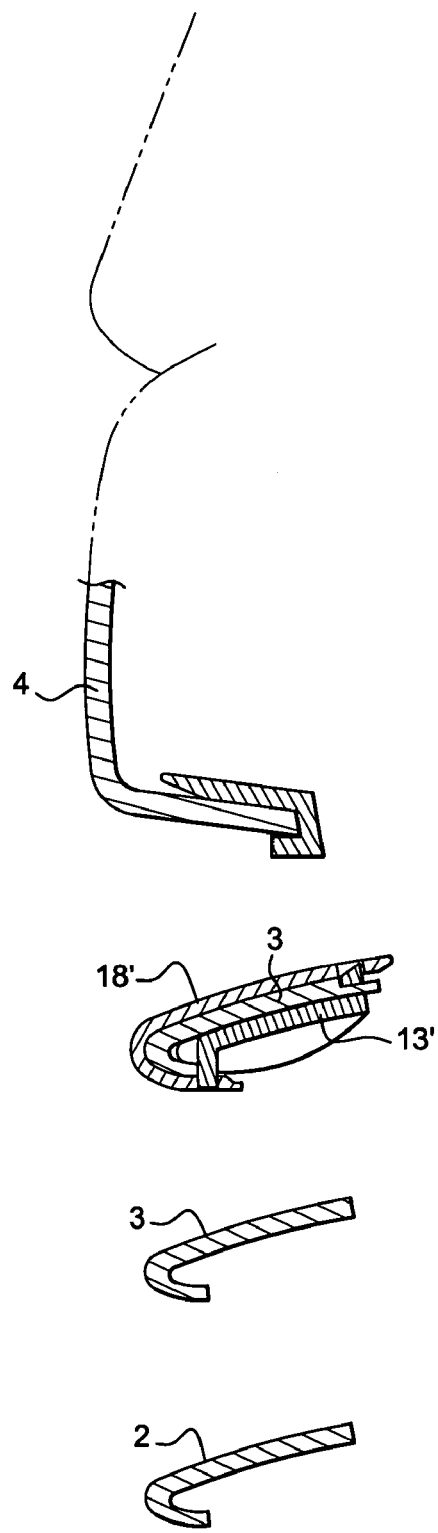
FIG. 6 is a view analogous to FIG. 5 showing a variant embodiment.

In a variant as shown in FIG. 6, the piece of trim 18' covers only the outside face of the portion of bar 3, however at each of its ends it includes a snap-fastener for engaging co-operating ends of the strength member 13', such that the portion of bar 3 is likewise held sandwiched between the piece of trim and the strength member.

Figure 7:
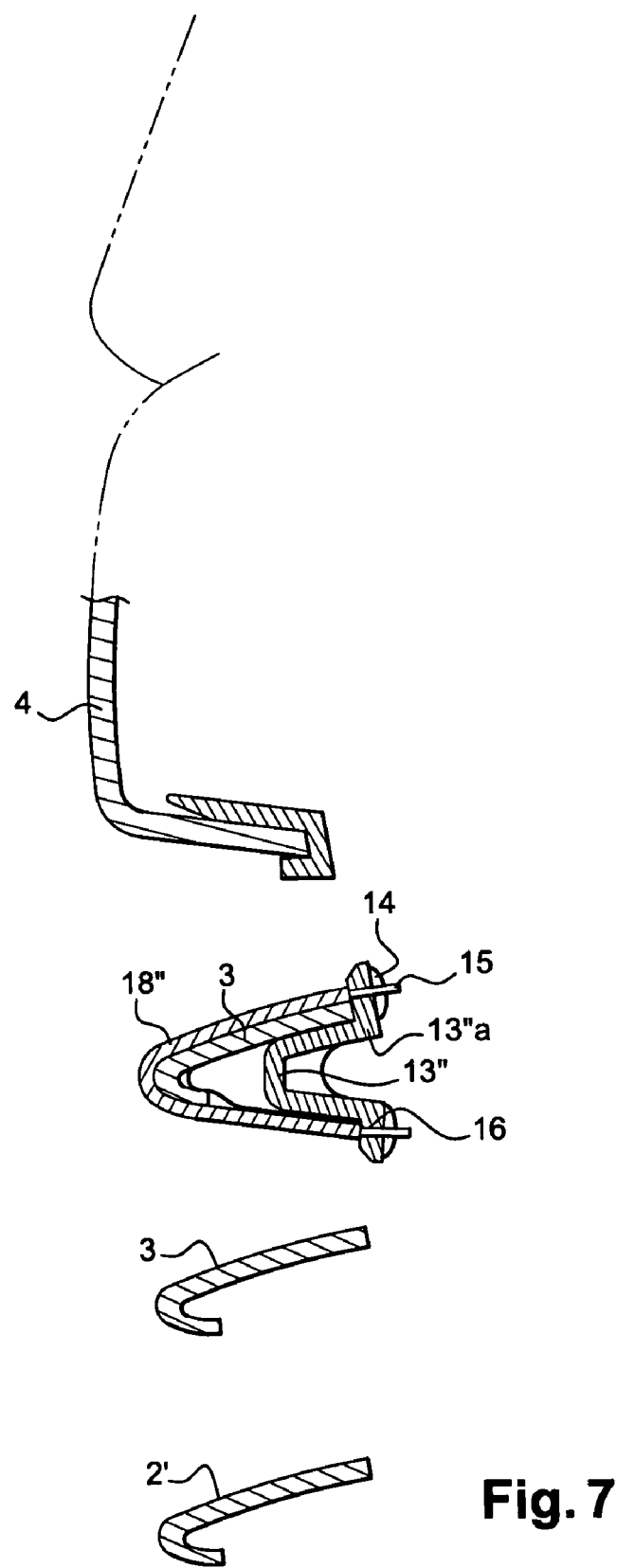
FIG. 7 is a view analogous to FIG. 5 showing another variant embodiment.
Figure 8:
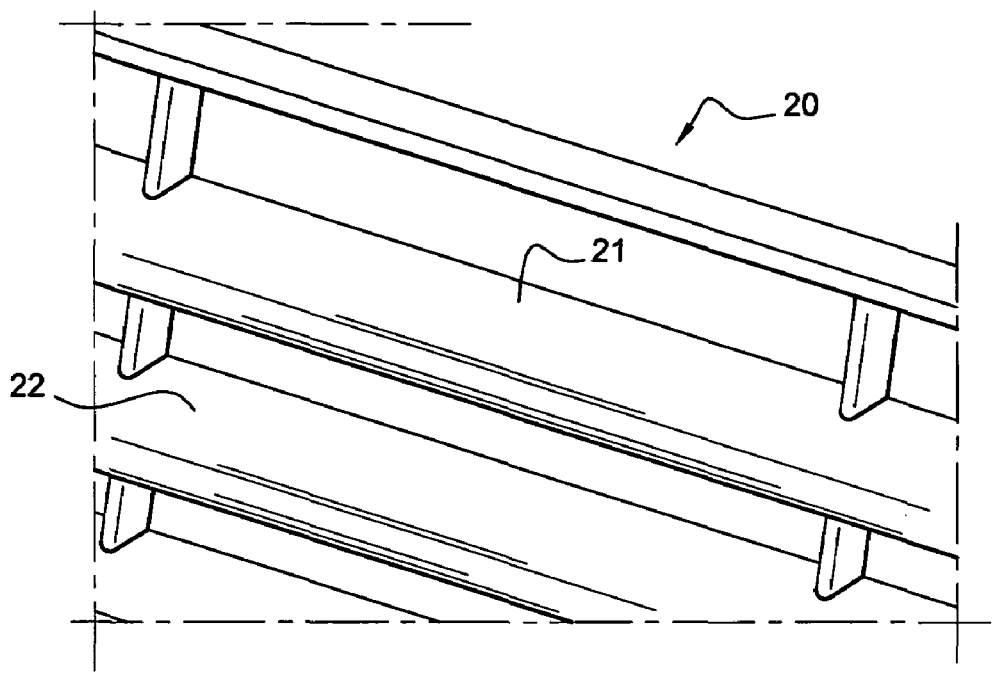
FIG. 8 is a perspective view of a portion of another grille, seen from in front.
Figure 9:
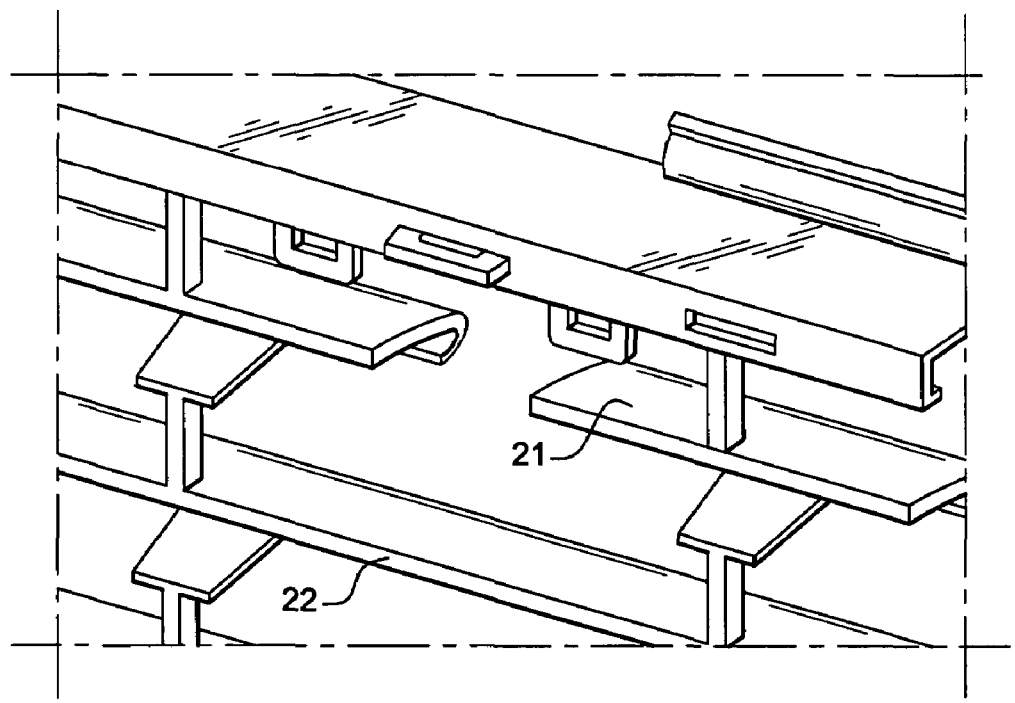
FIG. 9 is a perspective view of the FIG. 8 grille seen from behind, after a portion has been cut out from one of its bars.
Figure 10:
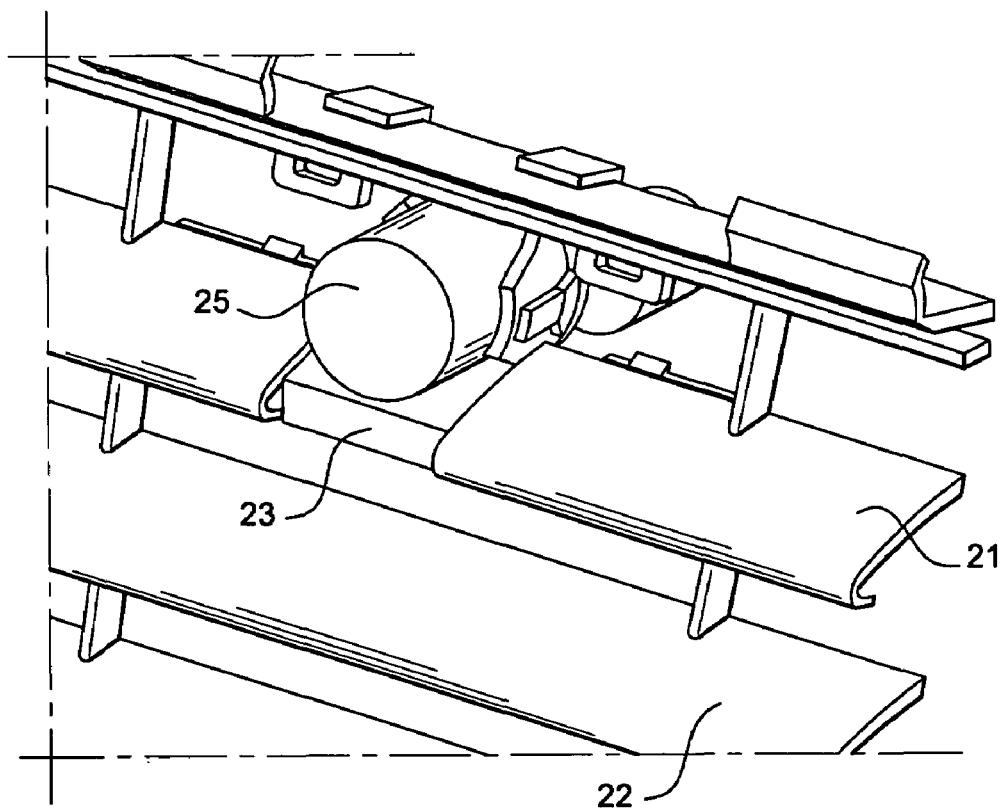
FIG. 10 is a view analogous to FIG. 8 after the strength member of a sensor support has been put into place from behind together with the sensor in the gap left empty by cutting out the bar.
Figure 11:
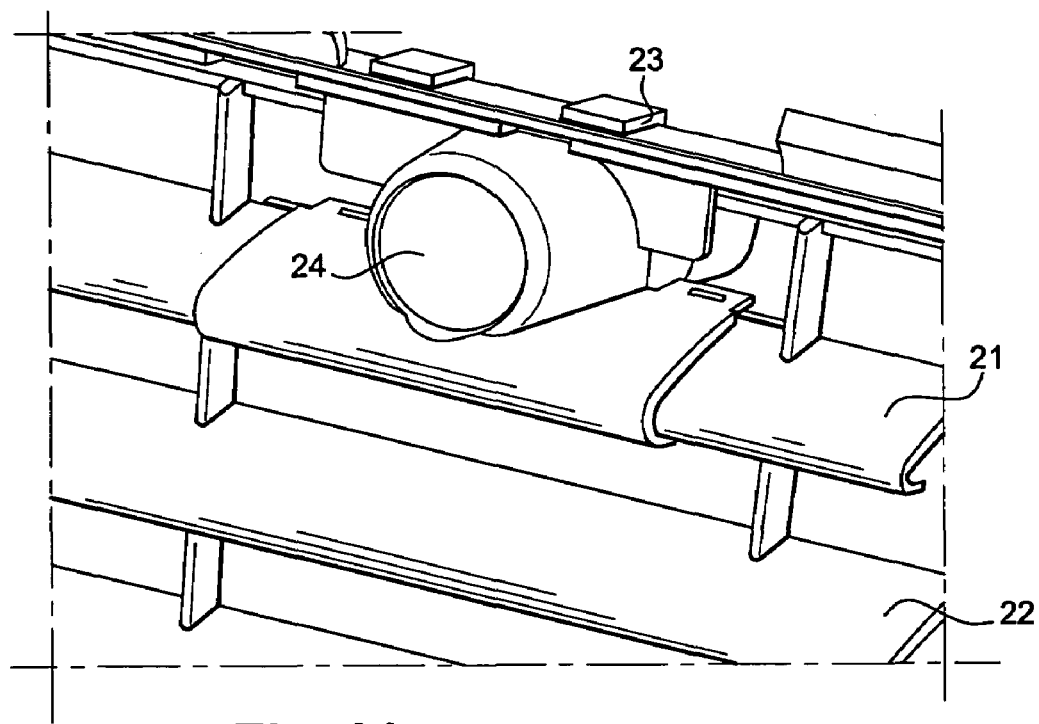
FIG. 11 is a view analogous to FIG. 10 seen from in front after the piece of trim has been put into place.
Figure 12:
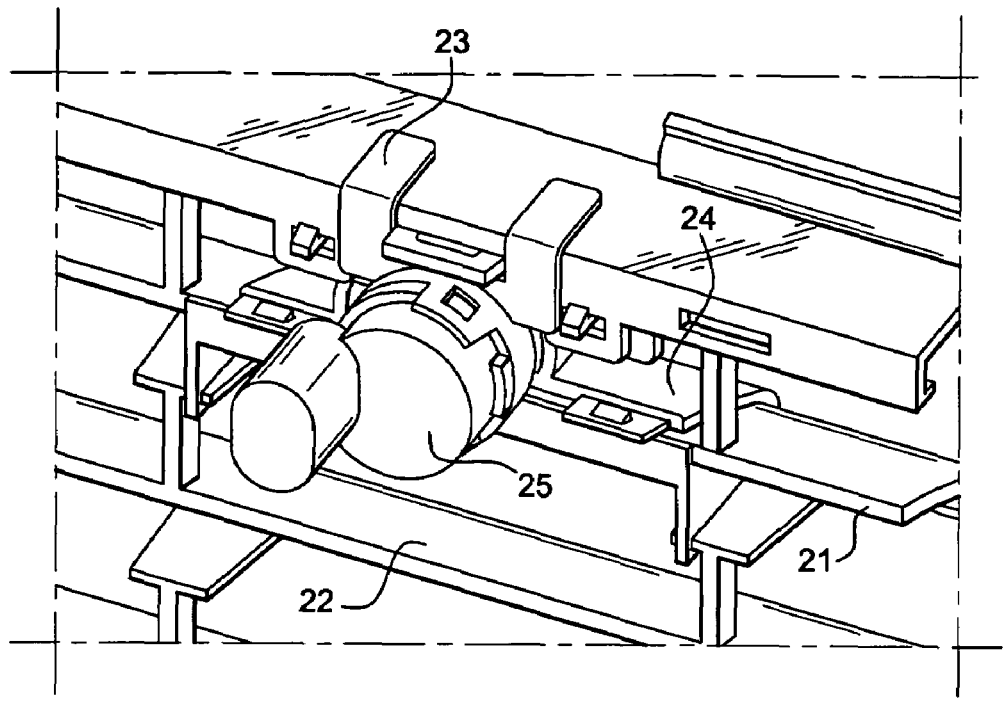
FIG. 12 is a view analogous to FIG. 9 after the sensor support and the sensor have been put into place.
Figure 13:
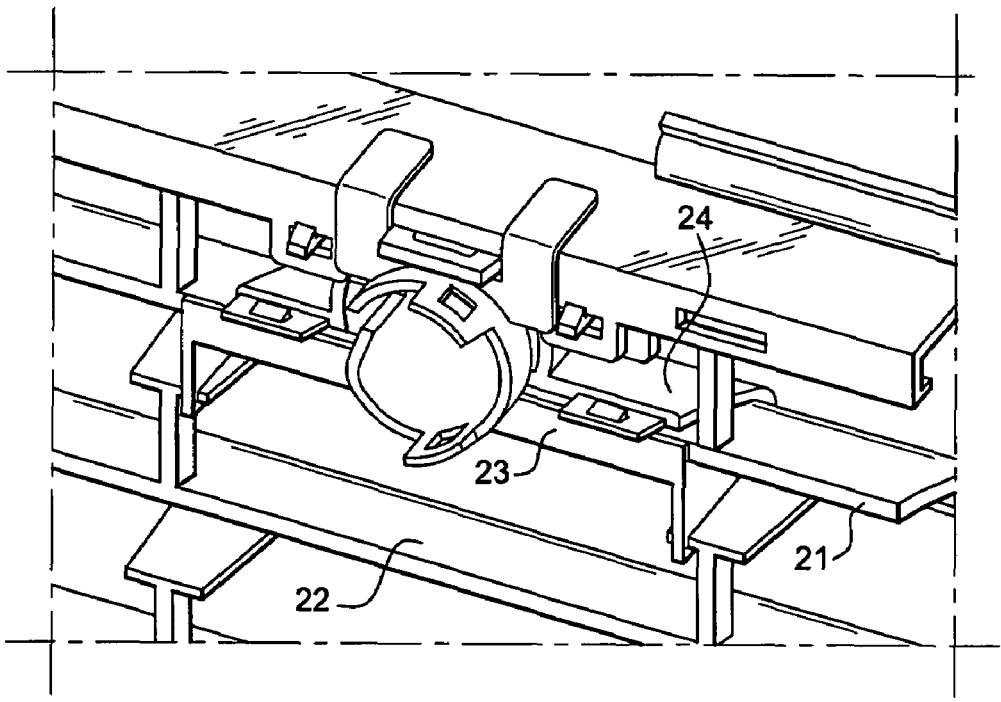
FIG. 13 is a view analogous to FIG. 12, with the sensor removed.

In a second variant, as shown in FIG. 7, the piece of trim 18" is of U-shaped section, enclosing a portion of the bar 3, whereas the strength member 13" is likewise of U-shaped section terminated by a flange 13" a suitable for being secured to the piece of trim 18" by rivets 14 mounted on projecting elements 15 of the piece of trim, passing through orifices 16 formed therein.

In the example of FIGS. 8 to 13, there can be found a grille 20 having bars 21, 22. The bar 21 has had a middle portion cut out and a strength member 23 is positioned from behind against the two remaining portions of the bar 21.

A piece of trim 24 is subsequently put into place from in front on the two portions of bar which it holds sandwiched between itself and the strength member with which it snap-fastens.

A sensor 25 is put into place in the support constituted in this way.

These embodiments are provided purely as examples and do not present any limiting character on the scope of the invention.

The invention claimed is:

1. An assembly for a motor vehicle having a grille comprising a plurality of bars, including a support comprising a support bushing arranged for receiving a sensor and an assembly base, wherein:
    a) the assembly base is shaped so as to be secured to at least two aligned portions of the bars that are spaced apart so as to leave room for a sensor;
    b) the assembly base comprises a strength member and a trim piece covering the strength member;
    c) the strength member and the trim piece sandwich the two aligned portions of the bars;
    d) the support includes a holder for holding the two aligned portions of the bar between the trim piece and the strength member; and
    e) the holder includes a fixed first portion of the trim piece and a movable second portion of the trim piece, the first and second portions being suitable for uniting and extending around the aligned portions and the strength member.

2. The support according to claim 1, wherein the fixed portion and the movable portion are suitable for uniting so as to become mutually engaged by snap-fastening.

3. An assembly for a motor vehicle having a grille comprising a plurality of bars, including a support comprising a support bushing arranged for receiving a sensor and an assembly base, wherein:
    a) the assembly base is shaped so as to be secured to at least two aligned portions of the bars that are spaced apart so as to leave room for a sensor;
    b) the assembly base comprises a strength member and a trim piece covering the strength member;
    c) the strength member and the trim piece sandwich the two aligned portions of the bars;
    d) the support includes a holder for holding the two aligned portions of the bar between the trim piece and the strength member; and
    e) the holder comprises two first portions belonging to the trim piece and two second portions belonging to the strength member, and the first and second portions being suitable for uniting, thereby enclosing the aligned portions between the trim piece and the strength member.

4. The support according to claim 3, wherein the first portions and the second portions are suitable for uniting so as to become mutually engaged by snap-fastening.

5. An assembly for a motor vehicle having a grille comprising a plurality of bars, including a support comprising a support bushing arranged for receiving a sensor and an assembly base, wherein:
    a) the assembly base is shaped so as to be secured to at least two aligned portions of the bars that are spaced apart so as to leave room for a sensor;
    b) the assembly base comprises a strength member and a trim piece covering the strength member;
    c) the strength member and the trim piece sandwich the aligned portions of the bars;
    d) the support includes a holder for holding the two aligned portions of the bar between the trim piece and the strength member; and
    e) the holder comprises projecting elements belonging to the trim piece and orifices belonging to the strength member, the trim piece and the strength member being arranged to sandwich the aligned portions while the projecting elements pass through and fasten to the orifices.

6. The support of claim 5, wherein the projecting elements fasten to the orifice by any fastener of the group consisting of rivets, flattening means and any combination thereof.

7. The assembly of claim 1, wherein the support bushing defines an interior and the interior receives the sensor and at least two bars are spaced apart so as to leave room for the sensor.

8. The assembly of claim 3, wherein the support bushing defines an interior and the interior receives the sensor.

9. The assembly of claim 5, wherein the support bushing defines an interior and the interior receives the sensor.

* * * * *